Jan. 5, 1971　　　　　　　F. E. HAWKINS　　　　　3,552,985
METHOD FOR MAKING ASBESTOS-CEMENT SHAPES
Filed Sept. 4, 1968　　　　　　　　　　　　　3 Sheets-Sheet 1
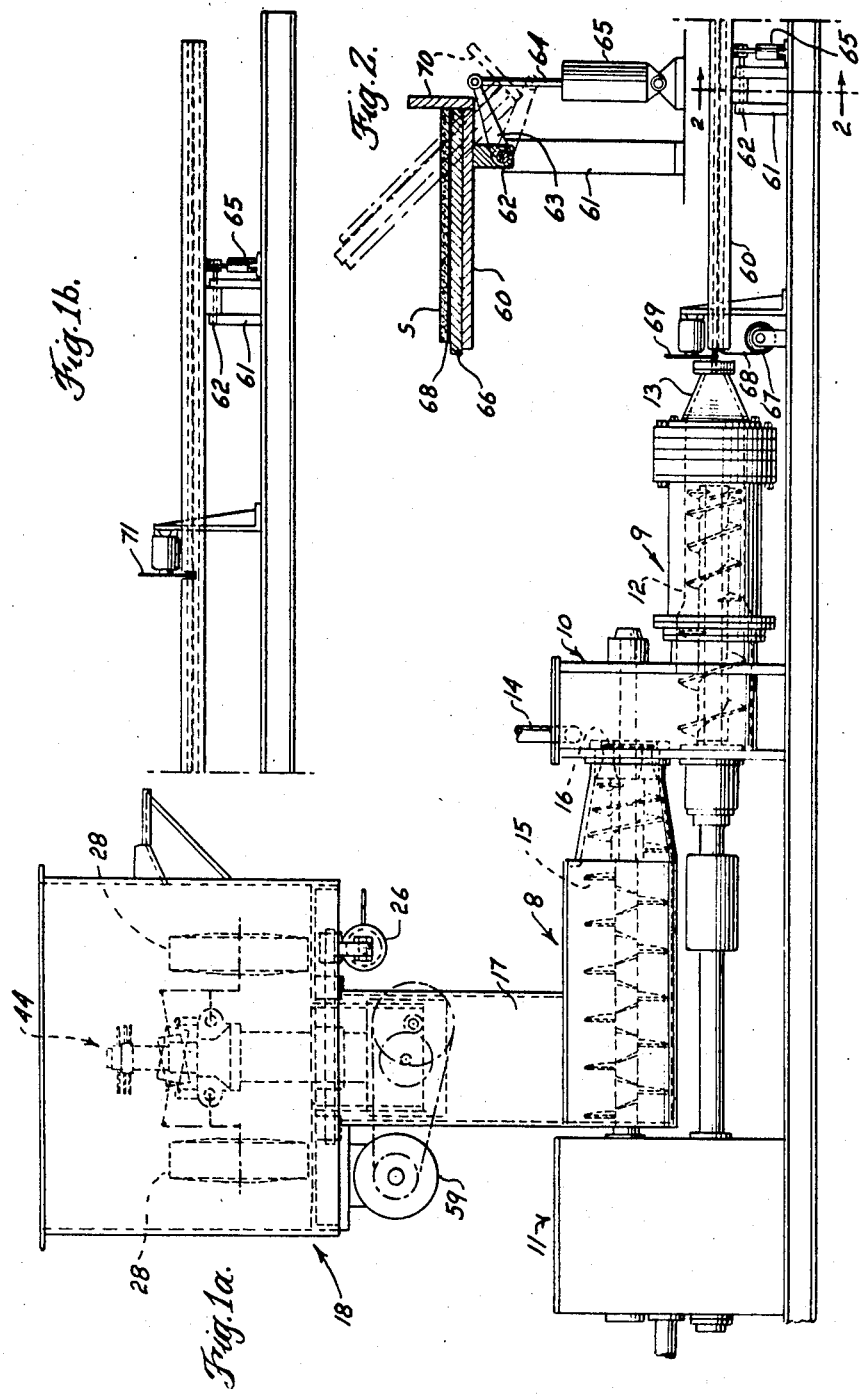
INVENTOR
FREDERICK E. HAWKINS
ATTORNEYS Jan. 5, 1971 F. E. HAWKINS 3,552,985
METHOD FOR MAKING ASBESTOS-CEMENT SHAPES
Filed Sept. 4, 1968 3 Sheets-Sheet 3
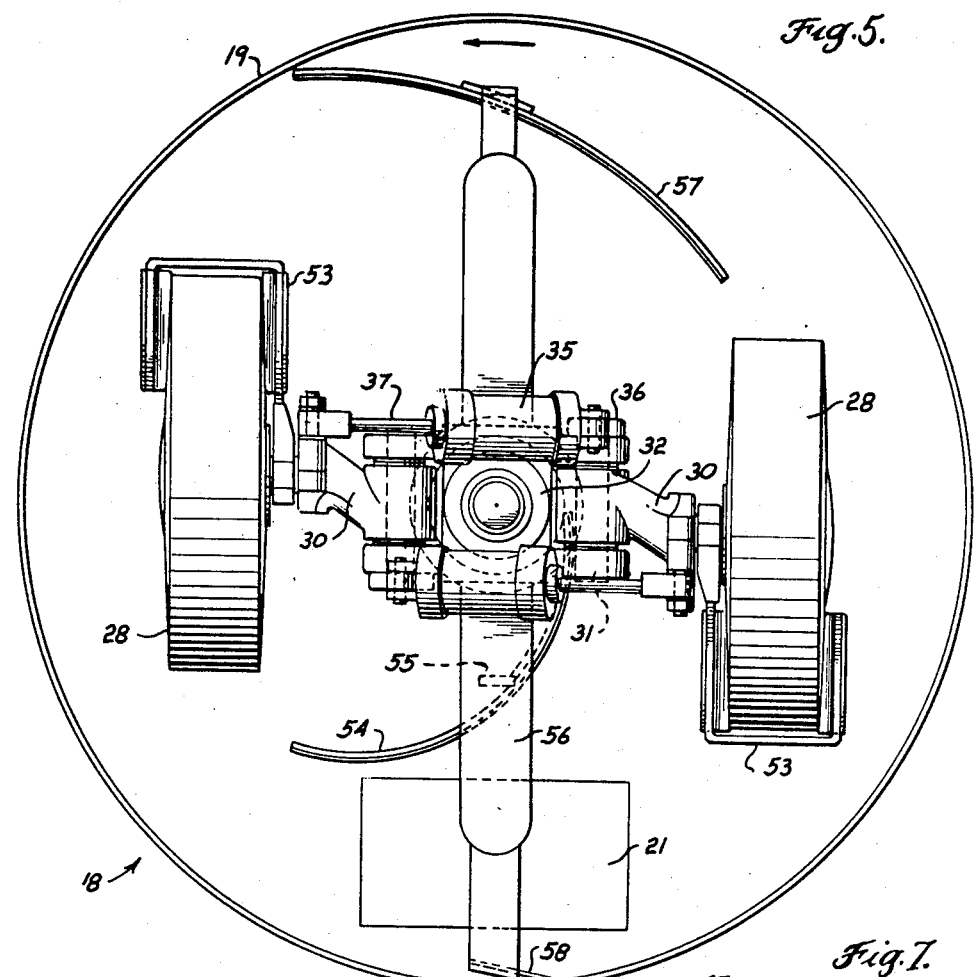
Fig. 5.
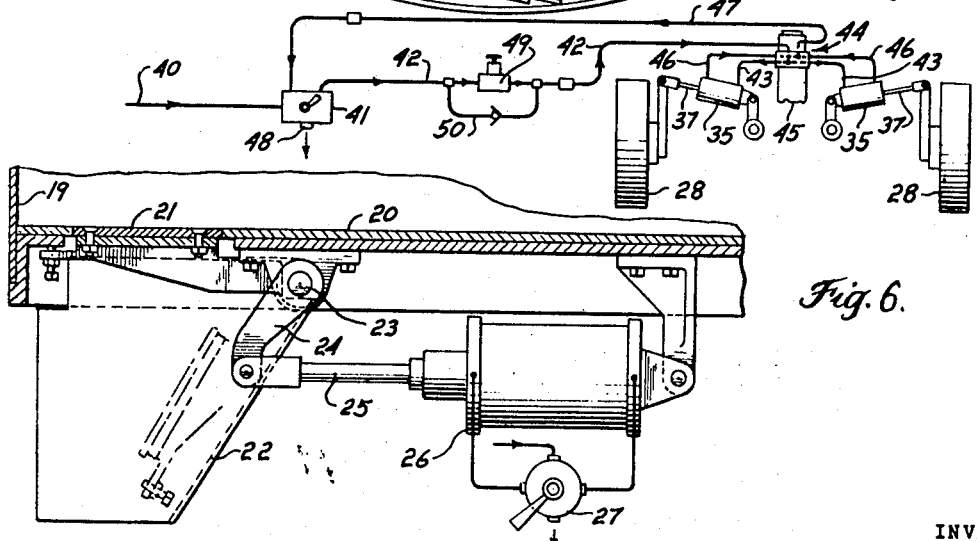
Fig. 7.
Fig. 6.
INVENTOR
FREDERICK E. HAWKINS
ATTORNEYS United States Patent Office 3,552,985
Patented Jan. 5, 1971

3,552,985
METHOD FOR MAKING ASBESTOS-CEMENT SHAPES
Frederick E. Hawkins, Ambler, Pa., assignor to Certain-Teed Products Corporation, Ardmore, Pa., a corporation of Maryland
Filed Sept. 4, 1968, Ser. No. 757,280
Int. Cl. C04b 31/08
U.S. Cl. 106—99                    4 Claims

ABSTRACT OF THE DISCLOSURE

A mixing technique for use in preparing the wetted mixture or furnish employed for extrusion of asbestos-cement shapes. The mixing technique comprises initial dry mixing of the asbestos and cement and the subsequent addition of the water in a plurality, preferably two stages, the mixing operation being continued after addition of the water of the first stage but being terminated substantially immediately upon addition of the water of the second stage. By the mixing following the first water addition the ingredients are thoroughly wetted out prior to the second water addition. By terminating the mixing substantially immediately upon completion of the second water addition the water of the second addition acts in the manner of a lubricant between the particles, thereby facilitating extrusion.

---

This invention relates to the production of articles or shapes composed of asbestos-cement compositions, and is especially concerned with a method for use in making elongated shapes, such as structural pieces, boards, pipes, etc.

It has long been proposed to fabricate or form various articles from aqueous asbestos-cement mixtures by means of extrusion, but this type of operation has been subject to disadvantages and difficulties, especially when employing screw extruders. One of the problems encountered heretofore is that the power requirements for effecting screw extrusion are excessively high if the aqueous asbestos-cement mixture fed to the extruder contains only the stoichiometric quantity of water, or a quantity such that the extrusion will retain its shape prior to curing. The extrusion of a shape retaining mixture is of great advantage, since otherwise it is virtually impossible to form articles of various complex shapes, or even articles having interior hollows which would be distorted or destroyed by sagging of material which is not sufficiently stiff to retain its shape.

Thus, although power requirements for extrusion may not be excessive if excess quantities of water are employed, it is not practical to handle the relatively soft extrusion resulting from a mixture containing excessive quantities of water.

Some attempts have also been made to form articles by extruding an asbestos-cement mixture containing an excess quantity of water, and thereafter rolling or squeezing the extrusion to eliminate excess water. This procedure has the disadvantage that the cross sectional shape of the piece being made is not established by the orifice in the extruder nozzle and is therefore much more subject to variation and inaccuracy than in the case where the cross sectional shape of the extrusion is established by the size or dimensions of the extrusion orifice.

With the foregoing in mind, the invention has as its principal general objective the provision of a method for facilitating the production of asbestos-cement shapes by screw extrusion.

In prior application Ser. No. 511,732 filed Dec. 6, 1965, now abandoned, of the present applicant and Joseph L. Cangelosi, assigned to the assignee of the present application, there is disclosed a method for facilitating extrusion of asbestos-cement mixes according to which the furnish is subjected to mixing action for only a very limited time following the addition of the water. A continuation-in-part of said prior application was filed on Sept. 9, 1968, under Ser. No. 767,892. This was found to improve the extrudability of the furnish and thereby overcome various of the difficulits previously encountered in the extrusion of asbestos-cement mixes, especially where the extrusion involved the use of a screw extruder.

The present invention has in view the same general objectives, but the method provided by the present invention achieves a still further improvement in extrudability in a novel manner.

Briefly, the technique of the present invention involves the multi-stage addition of the water to the previously mixed dry ingredients. Thus, in the preferred practice of the present invention the water is added in two stages, the first of which preferably comprises the bulk of the water and the second the balance thereof. Following the first water addition the furnish is subjected to mixing action, preferably in a muller for a period of time sufficient to thoroughly wet out all of the particles with the water of the first addition. Thereafter the balance of the water is added while the mixing action is continued, but very promptly after completion of the second water addition the mixing action is terminated.

By proceeding in this way, it appears that thorough wetting out of the particles and dry constituents is accomplished prior to the final water addition and this is of importance because it results in high strength products. According to the method of the invention, however, this thorough wetting out of the dry constituents is accomplished in the presence of only a portion of the total water to be used. After the addition of the remainder of the water, preferably comprising a minor fraction of the total, the mixing is virtually immediately terminated, thereby producing a condition in which the water of the second addition appears to act as a lubricant between the particles, so that the particles more readily move with relation to each other in the mix under the action of the extruder.

In consequence, the technique of the present invention not only provides for the formation of articles of high strength but in addition contributes to the ease of extrusion. This is evidenced by the relatively low power consumption in operating the screw extruder when employed with a furnish prepared in accordance with the present invention.

How the foregoing and other objects and advantages are attained will appear more fully from the following description referring to the accompanying drawings which illustrate the preferred embodiment of equipment employed, and in which:

FIGS. 1a and 1b, taken together illustrate in side elevational outline the overall arrangement of furnish mixing equipment, extrusion equipment, and equipment for handling the extruded pieces, all constructed and relatively arranged for use in association with the method of the present invention;

FIG. 2 is an enlarged sectional view taken as indicated by the line 2—2 on FIG. 1, and illustrating a portion of the equipment for supporting the extruded shapes as they are delivered from the extruder;

FIG. 5 is a plan view of the equipment shown in FIGS. 3 and 4;

FIG. 6 is a fragmentary vertical sectional view through the floor of the crib illustrating a controllable gate for delivering the aqueous asbestos-cement mixture from the crib to the extruder; and FIG. 7 is a diagrammatic view of a control system employed in association with the equipment of FIGS. 3, 4 and 5 and providing for lifting of the mulling wheels.

Figure 3:
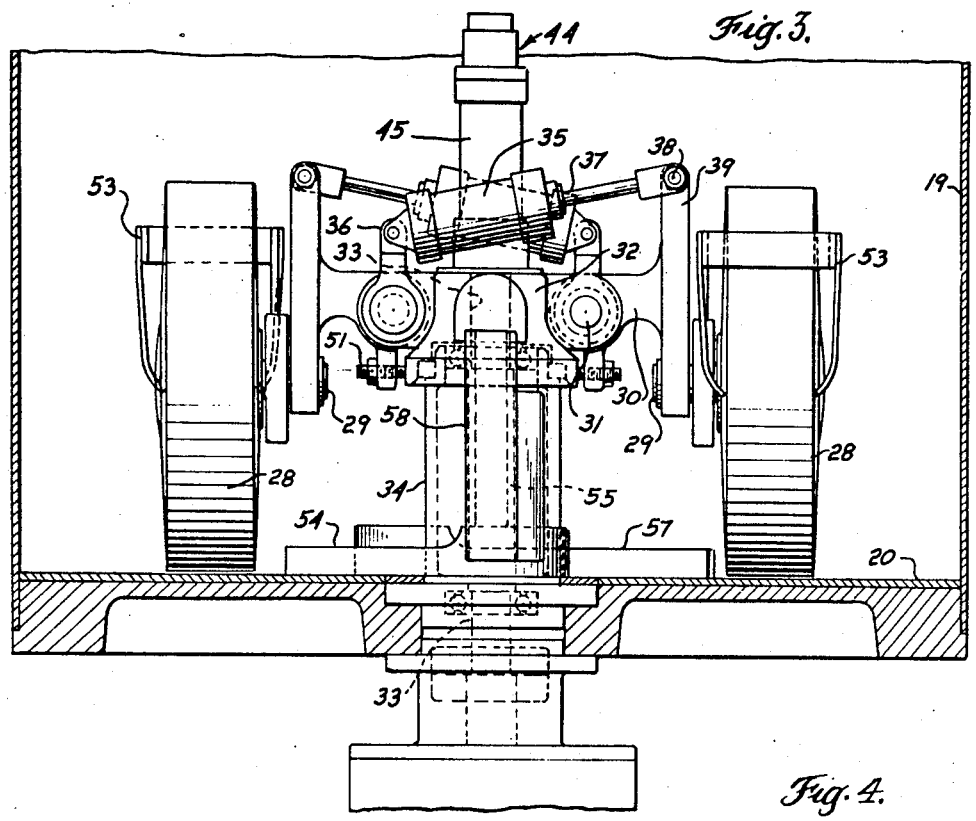
FIG. 3 is a vertical sectional view through a muller crib, with a pair of mulling wheels therein, the mulling wheels here being shown in normal position for effecting mixing of the ingredients of the furnish.

In connection with the illustration of equipment in the drawings it is to be kept in mind that some variations and modifications may be adopted, particularly in the general relative disposition of the major components. Thus, while the drawings illustrate a mixing apparatus located closely above the extruding apparatus, it should be understood that other general arrangements could be used for instance the mixing apparatus could be located on the same level with the extruding apparatus, and appropriate transfer mechanism provided.

In describing the equipment illustrated in the drawings, reference is first made to FIGS. 1a and 1b. In the lower portion of FIG. 1a there is illustrated a form of extrusion equipment suitable for employment in accordance with the present invention, this arrangement being of known type and including several components, such as the pug mill indicated generally at 8, the extruder indicated generally at 9, and an interconnecting vacuum chamber indicated at 10. The screw within the pug mill and the screw within the extruder are both adapted to be driven through the drive mechanism indicated generally at 11.

The details of the components 8, 9, 10 and 11 need not be considered herein as they form no part of the invention per se but it is mentioned that, as shown, the extruder 9 comprises a cylindrical shell in which a screw 12 is adapted to work, the screw blades being of decreasing pitch toward the delivery end (toward the right in FIG. 1a) in order to increase the compression in the region just in advance of the extrusion orifice, which is provided at the right-hand end of the nozzle indicated at 13. In the example illustrated, it is assumed that the extrusion nozzle has a rectangular orifice therein suitable for extrusion of an elongated piece or board of rectangular shape, as indicated at S in FIG. 2.

The input end of the extruder 9 receives the material to be extruded through a chamber 10 in which a vacuum is drawn, for instance by means of the vacuum connection 14, the material to be extruded being delivered into the upper portion of the vacuum chamber from the delivery end of the screw 15 disposed within the pug mill 8. The flights or turns of the screw elements of the pug screw 15 are also of decreasing pitch toward the discharge end, in order to increase the compression just in advance of the delivery of the material into the vacuum chamber 10. Suitable choppers indicated diagrammatically at 16 are arranged at the delivery end of the pug mill in order to subdivide the material as it enters the vacuum chamber, thereby facilitating release of air and gases entrapped in the asbestos-cement mixture by the action of the vacuum in the chamber 10, in a manner known per se in equipment of this sort.

The entrance end of the pug mill (toward the left of FIG. 1a) is supplied with material from the reservoir or supply chamber 17 which extends upwardly from the pug mill to the floor or bottom of the muller crib which is indicated generally in FIG. 1a by the numeral 18.

Turning now to the equipment as illustrated in FIGS. 3 to 7 inclusive, it will be seen that the muller crib is formed of a cylindrical side wall 19 and a bottom 20 in the latter of which there is provided an opening with a closure or dump gate 21 (see particularly FIGS. 5 and 6), this gate being positioned above a chute 22 serving to direct the charge of mixed asbestos-cement from the crib into the supply chamber 17, from which the material is advanced into and through the pug mill by means of the screw 15, and ultimately into and through the extruder.

The gate is pivotally mounted at 23 and, through an arm 24, is adapted to be opened and closed by an operating rod 25 connected with a piston positioned within the cylinder indicated at 26. Opening and closing movement of the gate is adapted to be effected by a fluid pressure control valve 27 associated with a pneumatic system for supplying operating fluid to one end or the other of the cylinder 26, thereby opening or closing the gate 21.

A pair of mulling wheels 28—28 are rotatively mounted on shafts 29, each of which is carried by a bracket 30 pivoted at 31 to a hub member 32 which is journaled for rotation about a vertical axis in the center of the crib, in order to provide for traveling or running of the mulling wheels 28 on the bottom 20 of the crib and thereby effect the mixing action desired. The hub 32 is supported by and driven through a shaft 33 which extends upwardly through the bottom of the crib and through the hollow nonrotative shield or post 34.

Each of the wheels 28 is adapted to be lifted by means of a fluid-pressure piston and cylinder device including the cylinder 35 which is anchored to an apertured lug 36 rigid with the hub 32. The piston (not shown) operating within the cylinder 35 has a piston rod 37 projecting from the cylinder and connected by means of the pivot 38 with an arm or bracket 39 formed as a part of the pivoted bracket 30. By this mechanism each of the mulling wheels 28 may be raised from the position shown in FIG. 3 to the position shown in FIG. 4 and may also be lowered from the position shown in FIG. 4 to the position shown in FIG. 3 and may be held in the lowered position.

A fluid-pressure control system for the purpose of raising and lowering the mulling wheels 28 is illustrated diagramatically in FIG. 7. In that figure, a source of supply of operating fluid under pressure, for instance compressed air, is indicated at 40. By means of the valve 41, air may be supplied through the line 42 to the inner ends of the cylinders 35, by means of connections 43. A rotative union indicated generally at 44 serves to interconnect pipe 42 with the cylinder connections 43, this union being arranged at the upper end of an extension 45 projecting above the hub 32. With the valve in the position indicated in FIG. 7, the pressure from the supply line 40 enters the inner ends of the cylinders and thus forces the piston rods 37 outwardly, thereby applying a force tending to hold the mulling wheels 28 in their lower or operating position.

With the valve 41 in the position shown in FIG. 7. the outer ends of the cylinders 35 are connected with atmosphere through the cylinder connections 46 and the pipe 47, there being appropriate passages in the rotative union 44 for interconnecting the connections 46 with the pipe 47. The pipe 47 is connected through the valve 41 with atmosphere through the outlet 48.

Figure 4:
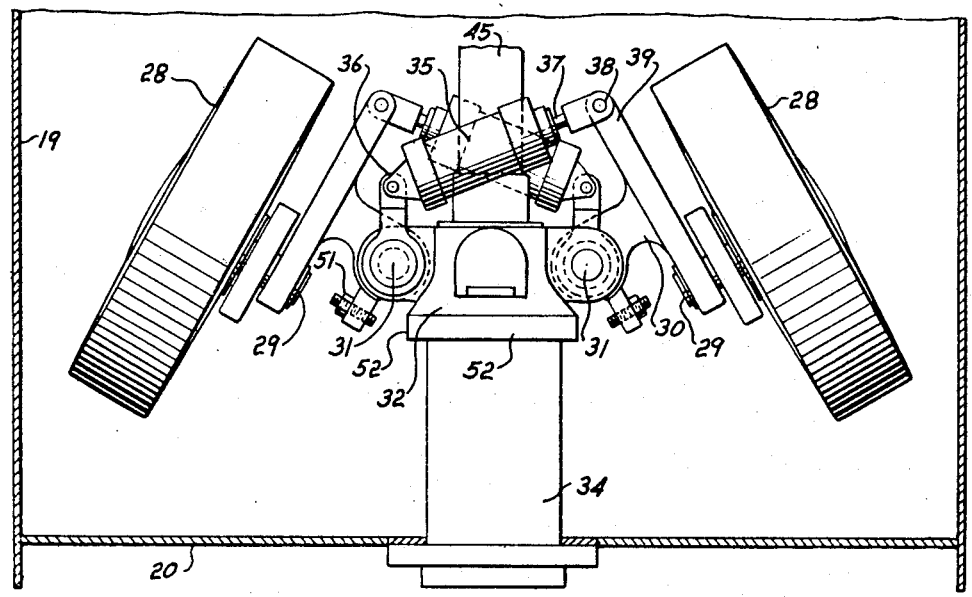
FIG. 4 is a view similar to FIG. 3 but illustrating the mulling wheels lifted from the mixing position in order to terminate the mixing operation.

When the valve 41 is adjusted to its other position, the operating air from supply line 40 flows through pipe 47 to the cylinder connections 46, thereby drawing the piston rods 37 inwardly and lifting the mulling wheels 28 as indicated in FIG. 4. At this time the inner ends of the cylinders are connected with atmosphere through the connections 43, the pipe 42, the valve 41 and the outlet 48. The valve 49 in the pipe 42 is bypassed as indicated at 50, so that when air is being exhausted through the line 42 the air passes around the valve 49. The bypass 50 is provided with a check valve preventing flow in the direction from the valve 41 toward the cylinders, but permitting flow in the reverse direction. The valve 49 is an adjustable pressure-regulating valve, and this arrangement is provided so that when the valve 41 is adjusted to the position shown in FIG. 7, thereby providing for urging the mulling wheels downwardly to their operating position, the pressure with which the wheels are urged downwardly may be adjusted by regulating the valve 49.

The lower or operating position of the mulling wheels 28 is limited by the adjustable screws 51, the inner ends of which are adapted to abut the stop surface 52 provided on the hub 32. These screws 51 are threaded into apertures formed in lugs which are integral with the pivotal brackets 30 in which the wheels are mounted. For the purpose of a typical mixing operation, the screws are adjusted so as to permit the wheels 28 to descend to positions approximately 1/16" from the bottom plate 20 of the crib.

Each of the wheels 28 is provided with scraper devices such as indicated at 53 which are connected with the mounting brackets 30 and which provide for scraping of materials from the wheels as they rotate and travel around adjacent the bottom surface of the crib during the mixing operation. In addition, rotative plows or scrapers are provided for deflecting the materials being mixed from the walls of the crib into positions under the wheels 28. Thus, as seen in FIGS. 3 and 5 a curved scraper plate 54 is connected with the rotative hub 32 by means of the upright member 55 on the arm 56, this plate serving to push the materials on the bottom surface of the crib from the region close to the center post 34 radially outwardly to a position underlying the wheels as they travel in the crib, the direction of rotation being indicated by the arrow in FIG. 5. A curved scraper plate 57 also mounted to rotate with the hub 32 lies close to the bottom of the crib and serves to deflect the materials on the bottom wall from the region adjacent the cylindrical wall 19 of the crib inwardly into position underlying the wheels 28. The rotative scraper blade 58 may be employed to scrape materials from the inner surface of the cylindrical wall 19.

The drive of the central vertical shaft 33 in the crib, to effect traveling of the mulling wheels adjacent the bottom surface of the crib may be effected by any suitable drive mechanism preferably arranged below the floor of the crib for instance the drive mechanism indicated diagrammatically in FIG. 1a. A motor 59 is there shown and this motor may be connected with the drive shaft through any suitable mechanism, the details of which need not be considered as they form no part of the invention per se.

As above mentioned, in the embodiment illustrated the discharge or nozzle device 13 of the extruder is provided with a rectangular discharge orifice in order to extrude a piece of rectangular section, such as the board S. In the embodiment of FIGS. 1a, 1b and 2 the piece being extruded is received and supported on an elongated table 60 pivotally mounted at the upper ends of supporting structure 61 by means of pivots 62 having axes paralleling the direction of extrusion in order to provide for tilting of the table between the full-line position shown in FIG. 2 and the position shown in dot-and-dash lines in FIG. 2. The table may either be tilted by hand or by power mechanism such as indicated, including arms 63 which are connected by means of piston rods 64 with operating cylinders 65, the rods 64 being associated with pistons (not shown) within the cylinders 65, by means of which the table may be rocked between the two positions indicated in FIG. 2.

When using the equipment of FIGS. 1a, 1b and 2, a board 66 is placed upon the table 60 and the piece being extruded is received upon this board 66, the board being removable and serving as a carrier element by means of which an extruded piece may be removed from the table and taken to an appropriate point for curing while additional pieces are being extruded.

For the purpose of facilitating sliding of the piece being extruded upon the board 66, a supply roll 67 of a film or web of material having a low coefficient of friction, such as waxed paper, is mounted below the end of the table 60 close to the extrusion orifice, the strip 68 being extended upwardly from the supply roll and thence over and along the board 66, in the position best seen in FIG. 2. In accordance with preferred technique, the leading end of the waxed paper strip is started over the leading end of the board 66 at the commencement of an extrusion, and the waxed paper travels with the extrusion, thereby reducing the friction between the extruded piece and the board 66 during the extrusion operation itself. When an appropriate length has been extruded, the extruder is temporarily stopped and the paper strip and extruded piece then severed. The extrusion itself may be cut off as by means of a cutting disc indicated at 69 mounted to travel transverse the direction of extrusion. The paper may be severed in any convenient manner.

After the extrusion of a piece of predetermined length and after severing thereof in the region of the extrusion orifice, the table 60 is preferably tilted, for instance in the position indicated in dot-and-dash lines in FIG. 2 in order to facilitate bringing the edge of the extruded piece S against the edge guide or "straight edge" 70 (see FIG. 2). This arrangement provides for straightening the piece just extruded prior to removal thereof from the table 60 and delivery or carrying of the piece to the curing station.

In accordance with another feature of the preferred technique of the invention, the table 60 and also the board 66 is of length equal to more than one times the desired length of the pieces being produced. For example, the table 60 is advantageously made of length equal to at least twice that of the length of the boards to be produced in accordance with the embodiment illustrated. Indeed the table is preferably made even somewhat longer than twice the length of the pieces being made for a purpose which will be explained. Each operation of the extruder is, in this illustrative embodiment, continued for an interval sufficient to extrude a piece at least twice the length of that ultimately desired. Upon the completion of such an extrusion operation, the cut-off disc 69 is operated as already mentioned above, and after straightening of the piece by tilting the table, the table is returned to the horizontal and the straightened piece is cut to form a plurality of pieces, for instance by a second cut-off disc shown at 71 in FIG. 1b. In the embodiment as illustrated the disc 71 is located in position to cut the extrusion at about the midpoint, thereby producing two articles or boards of the desired predetermined length, both of which have previously been straightened in one operation, in the manner already described with reference to FIG. 2. With many types of pieces there is a tendency for the initial portion of an extrusion to assume an excessive amount of curvature, and for this reason with many pieces it is contemplated to employ a table which is somewhat greater in length than twice the length of a piece to be made. For instance in the making of two 8 foot pieces, the table may desirably be of length sufficient to accommodate a 19 foot extrusion, and the cut-off saws arranged so as to cut off the leading 3 feet of the extrusion, and then to cut the remaining 16 feet at the center, in addition to effecting a cut near the extruder nozzle. The leading 3 foot piece may be returned to the pug mill for reuse.

Alternatively, an extra length table or support may be employed, and cuts may be made to separate the desired length of article by cutting only at a substantial distance, say a matter of 10 feet, from the extruder nozzle, and in this case, the "connection," so to speak, of the remaining portion of the extrusion with the extruder aids in preventing undesired or excessive curvature during the next succeeding extrusion operation.

As mentioned hereinabove, one of the problems encountered in attempts to extrude asbestos-cement compositions, especially by screw extrusion, is the excessive power required to effect the extrusion. According to the present invention the power required is reduced as a result of mixing the ingredients of the extrusion composition in a special manner as will be described just below in connection with a typical mixing operation.

The dry ingredients are first introduced into the crib 18. Although for most purposes the presence of at least some silica is preferred, this is not necessary and in an illustrative composition usable with the present invention the dry ingredients may include only cement and asbestos, for instance about 50 pounds of asbestos for each 100 pounds of cement. In a typical composition a batch of dry ingredients as follows may be placed in the muller crib:

| | Pounds |
|---|---|
| Fiber | 157.5 |
| Cement | 313.0 |
| Silica | 216.5 |
| Lime | 13.0 |
| | 700.0 |

In a typical operation according to the present invention the dry mix is mulled for a period of about 2½ minutes before the addition of any water. One hundred and fifty pounds of water are then added over an interval of about 40 seconds and the operation of the mulling wheels is continued during the water addition and for a period between about 20 seconds and 2 minutes, in a typical case for about 40 seconds following the water addition.

Subsequent to the foregoing, 20 more pounds of water are added over an interval of a few seconds, and the mulling is continued during this second stage water addition but is terminated just as soon as it is completed. If desired the mulling may be terminated a few seconds after the termination of the second water addition, but preferably not more than about 5 seconds after the second water addition.

It will thus be seen that in the first stage of water addition there is thorough mulling and mixing action, but in the second stage only a light mixing action. This produces a combination of desirable results including high strength because of good wetting out of the dry ingredients in the first stage, and easy extrusion because of the water of the second stage being present without extensive mixing, so that it appears to function somewhat in the manner of a lubricant between the particles. The disclosed procedure also permits more leeway in the ratio of water to solids in the mix.

Variations in the composition of the mix may of course be resorted to and in addition variations may also be made in the proportion of the total water added in each stage. Thus a smaller percentage of the total water could be added in the first stage and a larger percentage in the second, as compared with the typical example given above. It is preferred, however, that the first stage should constitute more than half, for instance from 60% to 95%, and the second stage the balance.

Some variation is also permissible in the time over which the water is added and in the length of time of the mixing following the first water addition.

Finally, it would even be possible to introduce the water in more than two stages, but in any event it is preferred that the final stage represent from about 40% to about 5% of the total water addition and that the mixing action should be terminated soon after the addition of the water has been completed, for instance within from about 1 second to 20 seconds, usually not more than 10 seconds.

The quantity of water employed may vary from about 22 to 30 parts by weight for each 100 parts of the dry ingredients, a preferred range lying between about 23 and 28 parts by weight.

It may also be noted that the size of the batches prepared for mixture in the crib advantageously runs from about 200 pounds to about 800 pounds of the dry ingredients, preferably at least from about 400 to 500 pounds. The cement and asbestos together will always make up at least half of the dry ingredients.

The dry mixing of the ingredients may continue for a time running from about 30 seconds to about 10 minutes, but usually not more than about 2½ minutes is needed. Because of the appreciable length of time of mixing of the first stage water addition, the dry mixing may be shortened, as compared with other procedures.

After a batch of material has been prepared in the crib in the manner described above, the batch is dumped into the reservoir 17 above the pug mill 8 by opening the dump gate 21 (see FIG. 6). This batch then serves as a source of supply for the pug mill 8 and the extruder itself (9) during the mixing of a subsequent batch. With the embodiment of the apparatus as shown in FIGS. 1 to 7, the extruder and pug mill may be operated intermittently providing an interval of dwell during each operation during which the cut-off disc 69 is operated, the table 60 is tilted and the cut-off disc 71 is operated.

Termination of the mulling is advantageously effected by lifting the mulling wheels, but may alternatively be effected by dumping the batch through the discharge gate 21 in the bottom of the crib.

Although the method of the invention may be used with ingredients of a variety of types, the following may be noted in connection with the kinds or types of cement, asbestos and silica preferably employed.

Portland cements in general may be used, especially those known to the trade as Types I, II, III and IIIa.

Although a variety of types of asbestos fibers may be employed, any of the seven grade fibers are preferred, a typical and especially advantageous type being Canadian Quebec chrysotile slip fiber.

The silica when used is preferably powdered so that the bulk will pass through a 200-mesh screen. Various forms of commercially available silica are usable where this ingredient is added to the composition, although as above noted the mixture need not necessarily contain any silica.

It has been found that the foregoing technique for mixing the furnish employed in extrusion, and especially in formation of continuous shapes by a screw extruder greatly facilitates the forming operation and overcomes numerous of the difficulties heretofore encountered.

I claim:

1. A method for making elongated asbestos-cement shapes by screw extrusion comprising mulling a dry mix comprising asbestos fibers and powdered portland cement, adding water to the mix in an amount from about 22 to 30 parts by weight for each 100 parts of the dry ingredients, the water being added in a plurality of stages one of which comprises at least half of the total quantity used and the last of which comprises from 5 to 40% of the total quantity used, continuing the mulling during the addition of said stages of the water, the duration of the mulling after said one stage of water has been added being only until the mix is thoroughly wetted out with the water of said one addition, thereafter adding the balance of the water within a period of a few seconds and terminating the mulling not more than 20 seconds after the final water addition, delivering the mulled wetted mixture to a screw extruder, and effecting extrusion of the elongated shape thereby.

2. A method as defined in claim 1 in which the water is added in two stages, the first of which comprises from about 60% to about 95% of the total quantity of water used, the balance being added in the second stage.

3. A method as defined in claim 1 in which the wetted mix is mulled after the first water addition for a period of from 20 seconds to 2 minutes.

4. A method as defined in claim 3 in which the mulling is terminated within 10 seconds after the second water addition has been completed.

References Cited

UNITED STATES PATENTS

| | | | |
|---|---|---|---|
| 3,219,467 | 11/1965 | Redican et al. | 106—99 |
| 3,204,019 | 8/1965 | Schulze | 106—99 |
| 2,246,537 | 6/1941 | Rembert | 106—99 |
| 2,156,308 | 5/1939 | Schurb | 106—99 |
| 2,084,354 | 6/1937 | Morbelli | 106—99 |
| 1,977,158 | 10/1934 | Thurman et al. | 106—99 |
| 1,850,308 | 3/1932 | Saunders | 106—99 |
| 844,530 | 2/1907 | Von Mollenburck | 106—99 |

TOBIAS E. LEVOW, Primary Examiner

W. T. SCOTT, Assistant Examiner

U.S. Cl. X.R.

162—154